US008548948B2

(12) United States Patent
Glover (10) Patent No.: US 8,548,948 B2
(45) Date of Patent: Oct. 1, 2013

(54) METHODS AND APPARATUS FOR A FINE GRAINED FILE DATA STORAGE SYSTEM

(75) Inventor: Frederick S. Glover, Hollis, NH (US)

(73) Assignee: Oracle International Corporation, Redwood Shores, CA (US)

( * ) Notice: Subject to any disclaimer, the term of this patent is extended or adjusted under 35 U.S.C. 154(b) by 604 days.

(21) Appl. No.: 11/401,697

(22) Filed: Apr. 11, 2006

(65) Prior Publication Data

US 2007/0239806 A1 Oct. 11, 2007

(51) Int. Cl.
*G06F 7/00* (2006.01)
*G06F 17/00* (2006.01)
*G06F 21/00* (2013.01)

(52) U.S. Cl.
USPC .................. 707/640; 715/202; 713/185

(58) Field of Classification Search
USPC ........................................ 709/203; 707/204
See application file for complete search history.

(56) References Cited

U.S. PATENT DOCUMENTS

| 5,586,235 | A  | * | 12/1996 | Kauffman ..................... 715/202 |
| 6,298,441 | B1 | * | 10/2001 | Handelman et al. .......... 713/185 |
| 6,714,952 | B2 | * | 3/2004  | Dunham et al. .............. 707/645 |
| 6,983,287 | B1 | * | 1/2006  | Jayanti et al. ..................... 1/1 |
| 2002/0124137 | A1 | * | 9/2002 | Ulrich et al. .................. 711/113 |
| 2003/0182328 | A1 | * | 9/2003 | Paquette et al. ............... 707/204 |
| 2004/0088384 | A1 | * | 5/2004 | Taylor et al. .................. 709/219 |
| 2004/0122819 | A1 | * | 6/2004 | Heer et al. ......................... 707/6 |
| 2004/0143563 | A1 | * | 7/2004 | Saake et al. ....................... 707/1 |
| 2004/0193660 | A1 | * | 9/2004 | Gagne et al. .................. 707/204 |
| 2004/0254964 | A1 | * | 12/2004 | Kodama et al. .............. 707/204 |
| 2005/0015407 | A1 | * | 1/2005 | Nguyen et al. ................ 707/200 |
| 2005/0060498 | A1 | * | 3/2005 | Curtis ............................ 711/134 |
| 2005/0071390 | A1 | * | 3/2005 | Midgley et al. ............... 707/204 |
| 2005/0102292 | A1 | * | 5/2005 | Tamayo et al. .................. 707/10 |
| 2005/0203973 | A1 | * | 9/2005 | Yagawa ......................... 707/204 |
| 2006/0004763 | A1 | * | 1/2006 | Horvitz et al. ..................... 707/9 |
| 2006/0026229 | A1 | * | 2/2006 | Ari et al. ....................... 709/203 |
| 2006/0053177 | A1 | * | 3/2006 | Suomela et al. ............... 707/204 |
| 2006/0053178 | A1 | * | 3/2006 | van Ingen et al. ............ 707/204 |
| 2006/0059171 | A1 | * | 3/2006 | Borthakur et al. ............ 707/100 |

OTHER PUBLICATIONS

Wen-Jiin Tsai; Multi-Partition Raid: A New Method for Improving Performance of Disk Arrays under Failuer; 1997; Institute of Computer Science and Information Engineering National Chiao Tung University, Hsinchu, 300, Taiwan, ROC'pp. 1-13.*

* cited by examiner

*Primary Examiner* — Apu Mofiz
*Assistant Examiner* — Jermaine Mincey (57) ABSTRACT

A method for maintaining access information for individual data portions within a file. Generally, the system disclosed herein provides a method for procuring and maintaining various access information specific to data portions within a file. Thus, by providing specific access information to a file data portion the access manager allows a process to perform processing on the individual file data portion. Consequently, the process can operate more efficiently since it is no longer required to access and perform processing on the entire file.

14 Claims, 7 Drawing Sheets

FIG. 7

METHODS AND APPARATUS FOR A FINE GRAINED FILE DATA STORAGE SYSTEM

BACKGROUND

Conventional computer systems operate software applications and processes that store and organize data within various data formats. One example of a software application that is responsible for storing data is a file system that is commonly part of an operating system of a computer. A file system operates to perform tasks such as creating and formatting disk areas for storage of computer files, storing data in files, retrieving data in files, organizing files in memory, and the like. A file system generally handles file system calls made by user applications to the operating system to read or write data to storage such as a disk storage system. The file system initially formats the storage medium, such as one or more disk drives, and thereafter can process the file system calls to create new files, and add and remove (read, write and delete) data to and from the individual files maintained on the storage medium by the file system.

The size of files in conventional file systems has continued to grow in capacity as new applications and uses are developed. Examples of such large individual files include multimedia files containing digitized audio and video images, electronic mail folders, voice mail files, and large business database documents. Applications such as backup and restore programs exist to prevent the permanent loss of files maintained by file systems. Traditional file system backup and restore solutions support a backup model that includes creating an initial full backup copy of a file system and its files, followed by periodically (e.g. nightly) creating a subsequent full copy of all files in the file system that have been modified since the previous full or incremental backup. In this manner, a conventional backup process is certain to have a full backup copy of each file as of the date that file was last modified. Conventional backup programs identify files for incremental backup operations through the use and examination of individual file date and time attributes stored at the beginning of each file within the file system. As a result, if a file is modified during the course of use, the file system updates file attributes (e.g. a time stamp) associated with that file to indicate the file has been changed. As a result, upon execution of the backup process sometime thereafter, the backup process can inspect the file attributes stored within the file on disk and can determine that the contents of this file are to be included in the incremental backup if the file has been modified since the last backup procedure was performed.

SUMMARY

Conventional technologies designed to perform file system functions such as creation, storage and backup of files suffer from a number of drawbacks. In particular, such conventional file system technologies do not allow, for example, a backup process to only access individual data portions within a data file for backup purposes without backing up the whole file. More specifically, in a conventional file system a file is typically divided into separate data portions that are distributed and stored to different regions of one or more physical storage devices (e.g., disk drives, tape drives, redundant array of independent disks "RAID", etc.). The separate file data portions, which are spread across any number of storage devices, are linked to one another through a system of pointers that are recorded in a table, or file segment map, that is stored on disk within the file system. While the file is divided or spread across different regions of a disk, the layout of that file and its modification information related to the last access to that file pertain to the file as a whole. This can be problematic when a program such as a backup application accesses the file. As one example, consider a 100-gigabyte ("GB") file for which only 5% of the file has been modified. At the time this small portion of the file is modified, the file system in the operating system will update information associated with the file to indicate this file has been modified. However, this information will not indicate with particularity which portion(s) of the file have been modified. As such, when a conventional backup program attempts to backup the file as a protective measure against loss of data, the backup program must backup the entire file since the file system provides no indication of which portions of the file have changed. Likewise, a restore program that is restoring a file from backup medium must restore the entire file, even though only a small amount of the file data is actually lost.

Furthermore, conventional file system technologies do not support the ability to maintain access pattern information specific to individual data portions within a file. As such, conventional file systems only provide access information (e.g., indicating a modification of data within a entire file) that encompasses or pertains to the file as a whole. Conventional file system technologies do not collect or maintain access pattern information such as who, how, when and by what application access is made to specific file portions. As will be explained, such information as provided by embodiment disclosed herein can be used to perform processing tasks on individual portions of a file to enhance overall computer system performance. For example, if it is known that a specific portion of a file is accessed each day at a certain time, the system disclosed herein can maintain this access information in association with that individual portion of the file and can use this data, for example, to preload that portion of the file into memory (i.e., from disk) prior to it being required for access by an application thus avoiding the disk to memory transfer delay that would otherwise normally be encountered had this access information not been maintained and used in this manner.

Embodiments of the access manager process disclosed herein are designed to substantially overcome these drawbacks and provide a method for procuring and maintaining access information for individual data portions within a file. By collecting, maintaining and using specific access information associated with each data portion of a file, the access manager allows a process to perform processing on the individual data portions themselves without requiring the entire file to be processed as a whole. Consequently, the process may operate more efficiently since it is no longer required to access and perform processing on the entire file.

In one embodiment of the system described herein, the access manager maintains modification information for each individual data portion of a file such as, for example, a database file, whereby the modification information indicates the time that a data portion within the database file was last modified. Assume for this embodiment that an incremental backup system performs intermittent backups of the database file, e.g., once every evening. Typically, an incremental backup system performs backup operations only on those files that have been modified since the prior execution of the backup process. However, with the ever-increasing size of data files, backing up an entire file is inefficient if only a small portion has been changed. With that in mind, this example embodiment provides an optimized solution for performing an incremental backup by using modification information maintained for each individual file data portion. Thus, the incremental backup process operates more efficiently by processing (e.g. backing up) only those data portions within the database file that have been modified since a previous incremental backup.

Additionally, embodiments described herein provide access pattern information describing the behavior of processes that access the individual file data portions. For instance, in one example embodiment file data portions have access pattern information indicating that a particular process is typically used for backing up large sequential blocks of data on a local memory device. In this instance, a process (e.g., cache manager) may use this particular access pattern information to proactively load file data portions into a cache or buffer in order to accelerate the backup process. This process may be useful, for example, in backing up large blocks of data within a database file or in the playback of large media files.

Configurations described herein further provide a method for processing file data that identifies data to be stored within a storage medium. The storage medium may be any type of computer memory device such as, but not limited to, a tape drive, a disk drive, removable media, RAID and the like. Furthermore, the method for processing file data divides the file data into a plurality of file data portions and stores the plurality of file data portions within the storage medium. For example, the method for processing file data may divide a 10 megabyte ("MB") database file into 1 MB portions and store the separate 1 MB file data portions on a disk drive. It should be noted that the file data portions are not necessary located in a sequential configuration on the storage medium.

Furthermore, the method for processing data maintains respective access information associated with each file data portion stored within the storage medium. The respective access information for a file data portion indicates, for that file data portion, at least one of, i) modification information operable to indicate if data has been modified within that file data portion (e.g., relative to a time); and, ii) access pattern information associated with a file data portion whereby the access pattern information indicates a pattern of access of the respective file data portion. In an example embodiment the access information may be maintained in an access manager process, in the individual file data portions, as part of the file system, or maintained in other similar processes, or the access information may be stored along with each respective file data portion to which it is associated. For example, in one embodiment the modification information represents a timestamp indicating the last time the respective file data portion was modified whereby the timestamp is maintained (e.g. updated and tracked) by an access manager process.

In an alternate configuration, the access pattern information may represent a frequency of access associated with a process that accesses the file data portion. For example, the frequency of access may represent how often a particular process accesses a file data portion within a fixed (or variable) time period. In this manner, frequency of access information is useful in providing efficient caching policies for determining which file data portions to bring into a cache and/or buffer region or, conversely, to determine which file data portions should be replaced and removed from the cache and/or buffer region.

In yet another embodiment, the access pattern information may represent an identity of a process that accesses the file data portion along with the last time of access of that process. Similar to the frequency of access information, the identity and last time of access of a process is useful in providing efficient caching policies as mentioned above. Other examples will be explained more fully herein.

Other embodiments of the invention include any type of computerized device, workstation, handheld or laptop computer, or the like configured with software and/or circuitry (e.g., a processor) to process any or all of the method operations disclosed herein. In other words, a computerized device or a processor that is programmed or configured to operate in accordance with the system as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

It is to be understood that the system of the invention can be embodied strictly as a software program, as software and hardware, or as hardware alone such as within a processor, or within an operating system or a within a software application. Example embodiments of the invention may be implemented within products and/or software applications manufactured by the Oracle Corporation of Redwood Shores, Calif., USA.

BRIEF DESCRIPTION OF DRAWINGS

The foregoing and other objects, features and advantages of the fine grained file data storage system will be apparent from the following more particular description of embodiments of the fine grained file data storage system, as illustrated in the accompanying drawings and figures in which like reference characters refer to the same parts throughout the different views. The drawings are not necessarily to scale, with emphasis instead being placed upon illustrating the embodiments, principles and concepts of the fine grained file data storage system.

DETAILED DESCRIPTION

Figure 1:
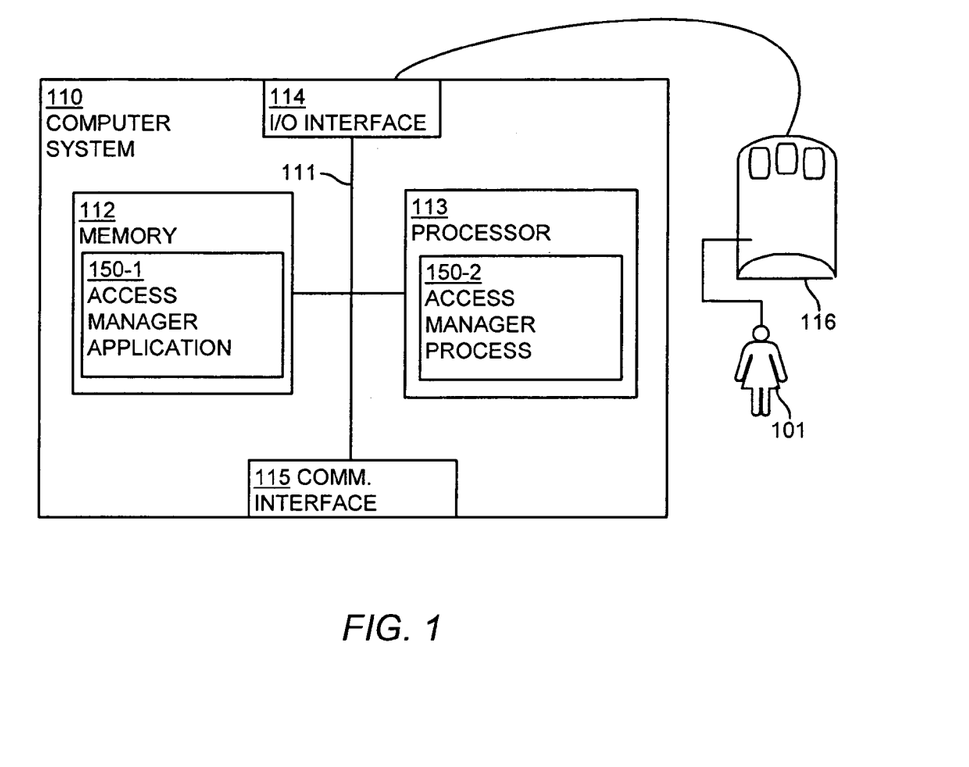
FIG. 1 is a block diagram of a computer system configured with an access manager application in accordance with one embodiment of the fine grained file data storage system.

FIG. 1 is a block diagram of a computer system environment 100 illustrating an example architecture of a computer system 110 that executes, runs, interprets, operates or otherwise performs an access manager application 150-1 and process 150-2 suitable for use in explaining example configurations of the system disclosed herein. The computer system 110 and user 101 represent any type of computerized device(s) such as a personal computer, workstation, portable computing device (e.g. Personal Digital Assistant, Cell phone, etc.), console, laptop, network terminal or the like. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (e.g., under control of a user 101) on a network 105.

The memory system 112 is any type of computer readable medium and in this example is encoded with an access manager application 150-1 that supports access manager implementations of a process and/or user, as explained herein. The access manager implementation 150 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the access manager application 150-1. Execution of the access manager application 150-1 in this manner produces processing functionality in an access manager process 150-1. In other words, the access manager application 150-1 represents one or more portions or runtime instances of the access manager process 150-2 performing or executing within or upon the processor 113 in the computer system 110 at runtime.

Figure 2:
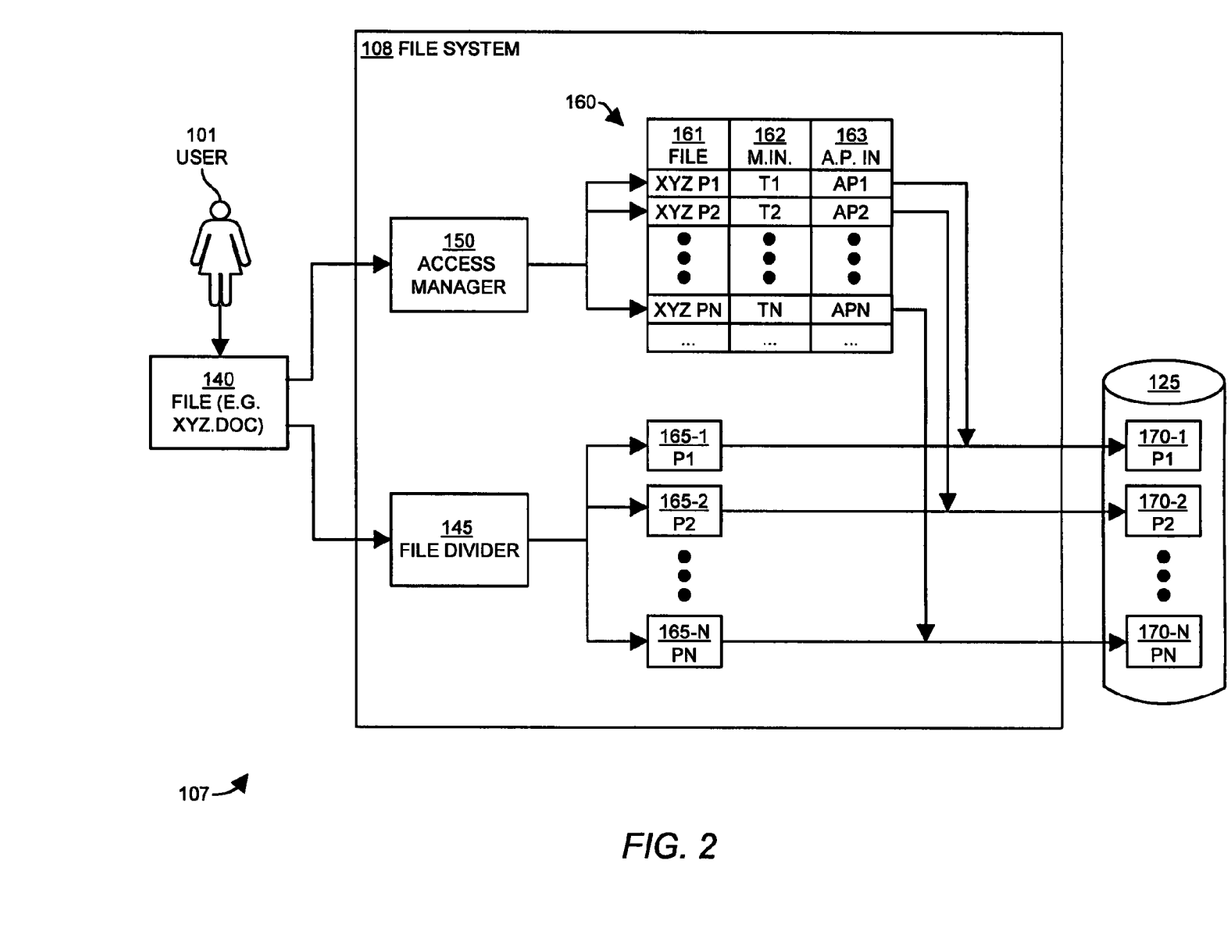
FIG. 2 is a block diagram of a file system configured with an access manager and file divider application in accordance with one embodiment of the fine grained file data storage system.

FIG. 2 is a block diagram of a file system environment 107 that includes a file system 108 configured with an access manager 150 and a file divider 145. A user 101 creates a file 140 which the file divider 145 divides into file data portions 165-1, 165-2 . . . 165-N in the file system 108 and that are then stored in a first memory device 125 as corresponding file portions 170-1 . . . N. The access manager 150 updates an access table 160 with information (e.g. modification times of each portion, or access pattern information) pertaining to each data portion of file 140. The access information table 160 includes file identity information 161 and corresponding access information for the respective file data portions. The access information, as depicted in access information table 160, comprises columns for modification information 162 and access pattern information 163. Operation of this system will be discussed shortly with respect to flow charts of processing steps.

Figure 3:
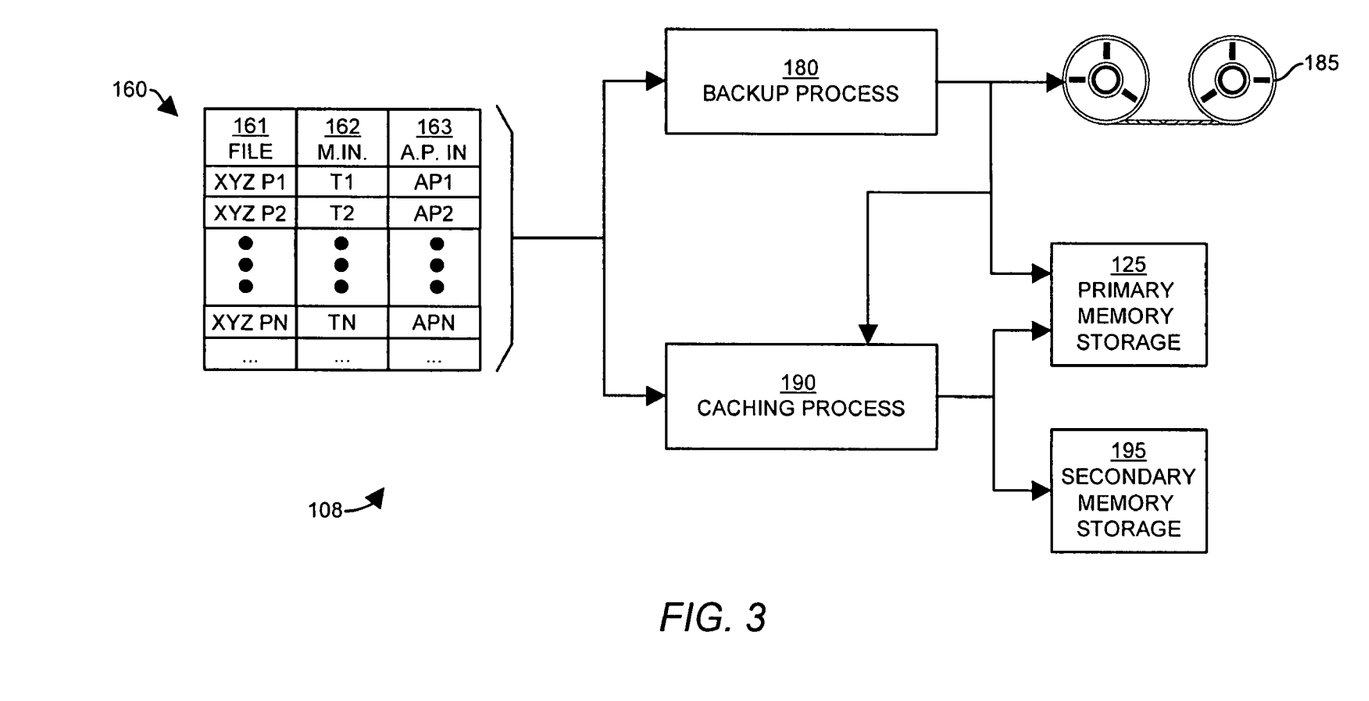
FIG. 3 is a block diagram of a file system in communication with a backup process and caching process in accordance with one embodiment of the fine grained file data storage system.

FIG. 3 is a block diagram depicting the file system 108 in communication with a backup process 180 and a caching process 190. This figures thus illustrates a use of the access information 160. The backup process 180 is in communication with a backup storage device 185 (e.g., tape drive) such that the backup process can store file data portions 165 from the first storage device 125 to the backup storage device 185 and vice versa. The caching process 190 is in communication with the first storage device 125 (e.g. a high speed cache) and a second storage device 195 (e.g. a disk or slower speed memory). As such, the caching process 190 performs memory management between the first and second storage devices 125, 195 according to data from the access information table 160.

Generally, the system disclosed herein provides a method for procuring and maintaining various access information specific to data portions 165 within a file 140. By providing specific access information to a file data portion 165 the access manager 150 allows a process to perform processing on the individual file data portion. Consequently, the process can operate more efficiently since it is no longer required to access and perform processing on the entire file.

In one embodiment of the system described herein, the access manager 150 maintains modification information relating to respective individual data portions of a file such as a database file whereby the respective modification information indicates, for each portion, the time that the data portion 165 within the database file was last modified.

Further details of configurations explained herein will now be provided with respect to flow charts of processing steps that show the high level operations disclosed herein that the access manager process 150 performs.

Figure 4:
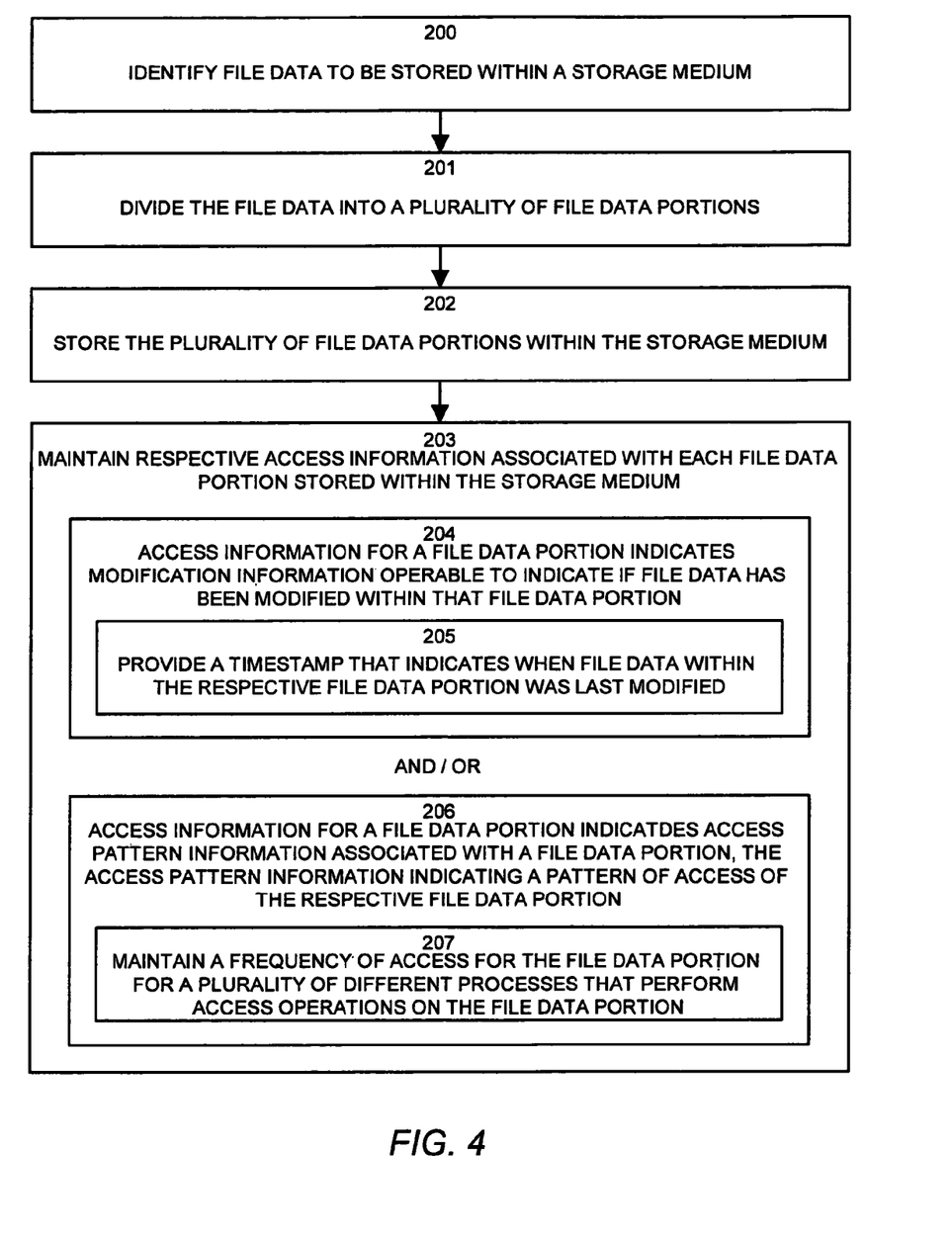
FIG. 4 is a flow chart of processing steps that shows high-level processing operations performed in accordance with one example configuration of the fine grained file data storage system.

FIG. 4 is a flow chart of processing steps that the access manager 150 performs to process data in accordance with one example configuration.

In step 200, the access manager 150 identifies file data to be stored within a storage medium. Typically, as in one embodiment, the access manager 150 identifies at least one file 140 (e.g., word processing document, database file, media file, etc.) that will be stored in memory in accordance with an operating system's file system 108. The memory may include, but is not limited to, tape drives, disk drives, RAID's and the like, or any combination thereof.

In step 201, a file divider 145 divides the file data into a plurality of file data portions 165-1 . . . N. In one embodiment, as depicted in FIG. 3, the file divider 145 divides the file 140 into file data portions $P_1, P_2 \ldots P_n$ 165-1 . . . N such that the file 140, as stored in memory, may be distributed across one or more memory storage units. The memory storage units may be memory based storage, or disk storage. As such, the file divider process is in communication with the access manager and provides the access manager information (e.g., file data portion size, file data portion location, etc.) related to the division of the file into file data portions 165.

In step 202, the access manager 150 stores the plurality of file data portions 165 within the storage medium 125. In various embodiments, the access manager 150 stores the file data portions 165 in both contiguous and noncontiguous locations within the storage medium 125. Furthermore, the size and number of file data portions 165 may depend upon the configuration of available storage located with the storage medium 125.

In step 203, the access manager 150 maintains respective access information associated with each file data portion stored within the storage medium. Further details of this processing will be described in steps 204 through 207 and in the remaining flow charts that follow.

In step 204, the access manager 150 indicates, for that file data portion 165, modification information 162 operable to indicate if file data has been modified within that file data portion 165. For example, in one embodiment the modification information 162 may function as a binary signal, or 'dirty bit', that indicates if file data within the respective file data portion has been modified. As will be discussed in more detail, the access manager 150 and other processes may rely on the modification information (e.g., the dirty bit) in order to perform independent processing on the respective file data portion 165.

In step 205, the access manager 150 provides a timestamp that indicates when file data within the respective file data portion was last modified (e.g., date and/or time of day).

In step 206, the access manager 150 indicates, for that file data portion 165, access pattern information 163 associated with a file data portion. The access pattern information indicates a pattern of access of the respective file data portion 165. As will be explained further, the access pattern information indicates the occurrence of various transactions with file data portions 165 over time.

In step 207, the access manager 150 maintains a frequency of access for the file data portion 165 for a plurality of different processes that perform access operations on the file data portion 165. Generally, the access manager 150 records access events over time whereby a process interacts with the file data portion 165 by accessing and/or modifying the data within the respective file data portion 165. Moreover, in example configurations the process may include, but is not limited to, a local or remote user, a local or remote computer program, an operating system call, or any combination thereof. For example, in one embodiment the access manager 150 maintains the number of times a backup process 180 accesses a data portion of a database file within a twenty-four hour time frame.

Figure 5:
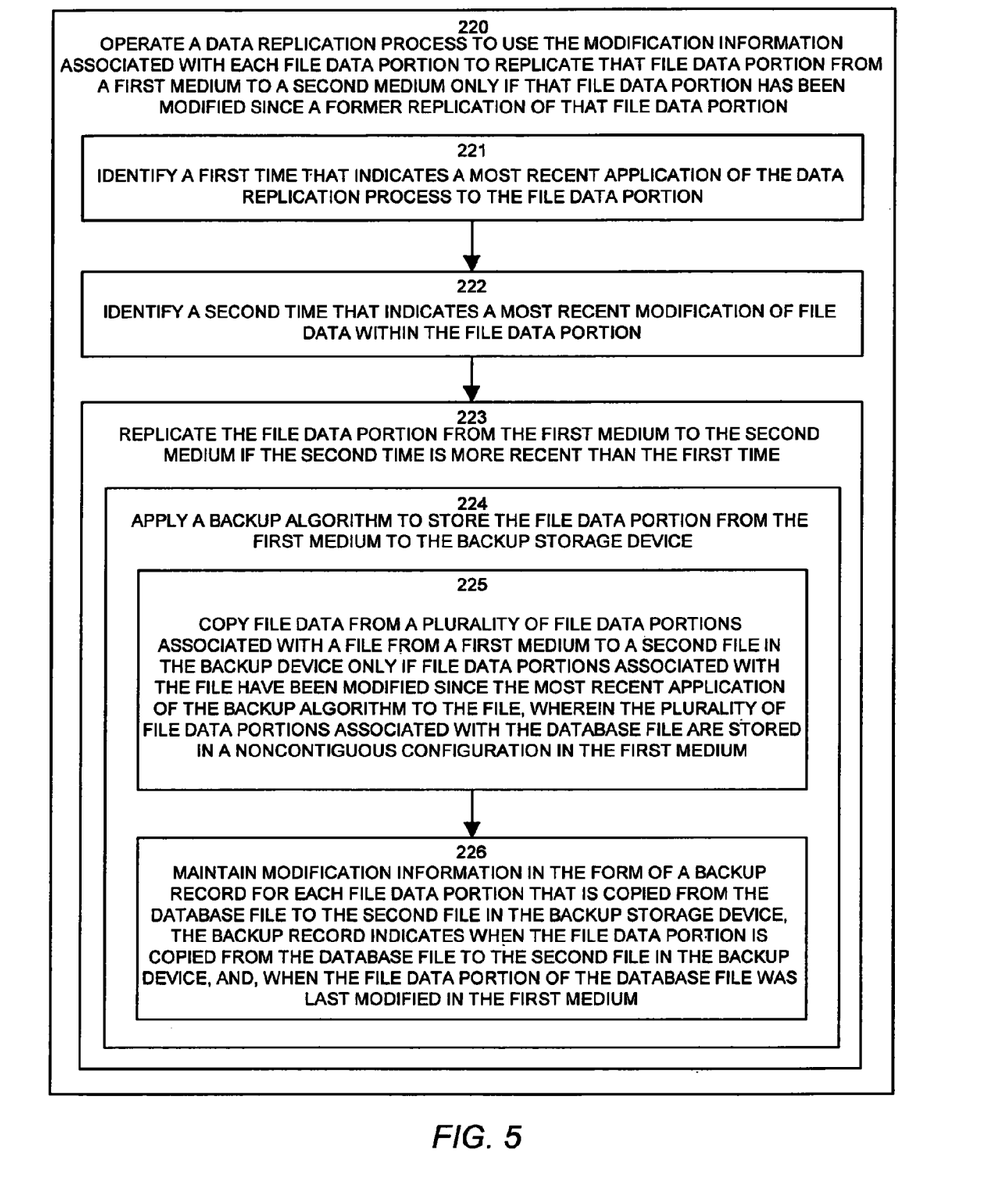
FIG. 5 is a flow chart of processing steps that shows details of replication and backup processing operations to replicate and backup file data portions in accordance with example configurations of the fine grained file data storage system.

FIG. 5 shows details of processing of the backup process 180 in accordance with one example embodiment. In general, this processing provides a backup process 180 that backs up a file system 108 by operating the backup process to back up only specific data portions 165 of the file 140 that have changed since a former backup of data portions for that file. The change is determined by examining the modification information associated with each portion 165 of the file 140. In this manner, a particular backup of the file system 108 includes data portions 165 of a particular file 140 that amount to less than the total data portions that make up an entirety of that file. That is, a first backup might be a full backup of the file, but subsequent backups only need to include those portions of the file for which the modification information 162 indicates a change has been made since the last backup. Because of this, when backups are performed, not all data portions 165 of a file 140 need to be backed up, thus saving backup processing time. Further details of this will now be explained in steps 220 through 227.

In step 220, the access manger 150 operates a data replication process to use the modification information 162 associated with each file data portion 165 to replicate that file data portion from a first medium to a second medium only if that file data portion has been modified since a former replication of that file data portion. Details of this processing will now be explained with respect to steps 221 through 226.

In step 221, the data replication process identifies a first time that indicates a most recent application of the data replication process to the file data portion 165. The "first time" in one example is a time of last backup, or replication, that was performed for the file 140.

In step 222, the data replication process identifies a second time that indicates a most recent modification of data within the file data portion 165. The second time in this example discussion may be the modification time of a particular file data portion 165. Since each file data portion 165 will have a modification timestamp indicating when that portion was last modified, the data replication process can query the access manager 150, file system 108 or other entity to determine when each file data portion 165 was last modified.

In step 223, the data replication process replicates the file data portion 165 from the first medium to the second medium only if the second time is more recent than the first time. In this manner, if a file data portion 165 has a timestamp later in time than the most recent backup, the data replication process will replicate this file data portion. Accordingly, only those file data portions 165 that have changed will be backed up and the data replication process operates efficiently by not having to replicate those file data portions 165 that have not changed. In an alternate embodiment, the data replication process uses a dirty bit instead of a first and second time. For example, in such a case if the dirty bit has been set, the data replication process would replicate the file data portion 165 from the first medium to the second medium.

Furthermore, in another example embodiment the data replication process is an internode replication application that copies data from a first host computer (e.g., the first medium) to another host computer (e.g., the second medium). In such a system, the internode replication application copies only those file data portions that have been modified since a previous execution of the internode replication application on the file in the first host computer. Since internodal transfers frequently occur between hosts at remote locations, the internode replication application can substantially free up network resources by reducing the amount of data transferred between nodes.

In step 224, the second medium is a backup storage device 185, and the backup process 180 applies a backup algorithm to store the file data portion 165 from the first medium to the backup storage device 185. As an example, the backup process 180 applies the backup algorithm to a database file 140 stored on a local disk drive 125 and, subsequently, stores various data portions from the database file to backup storage device 185 (e.g., tape drive, RAID, etc.) according to the backup algorithm. Typically, the backup process 180 queries the access manager 150 for the access information (e.g., timestamp or dirty bit) associated with the file data portions 165 involved in the backup process. However, in other example configurations the backup process 180 may procure access information from a file system 108 or directly from the file data portions 165.

In step 225, the backup process 180 copies data from a plurality of data portions 165 associated with a database file 140 from the first medium to a second file in the backup device 185 only if data portions associated with the database file have been modified since the most recent application of the backup algorithm to the database file. In this instance, the plurality of data portions 165 associated with the database file 140 are stored in a noncontiguous configuration in the first medium. Upon completion of the backup process 180, the second file in the backup device contains substantially the same data that was in the database file 140 at the time of performing the backup process 180. Therefore, instead of copying the entire database file 140, the backup process 180 performs efficiently by updating only those file data portions 165 that have been modified since the previous application of the backup algorithm.

In step 226, the backup process 180 maintains modification information 162 in the form of a backup record 199 for each file data portion that is copied from the database file to the second file in the backup storage device. In this manner, the backup record 199 indicates when the file data portion is copied from the database file to the second file in the backup device, and, when the file data portion of the database file was last modified in the first medium. The information contained in the backup record 199, in turn, can be used by the backup algorithm in a subsequent backup process 180 for determining which file data portions 165 to copy from the first medium to the backup device 185.

Figure 6:
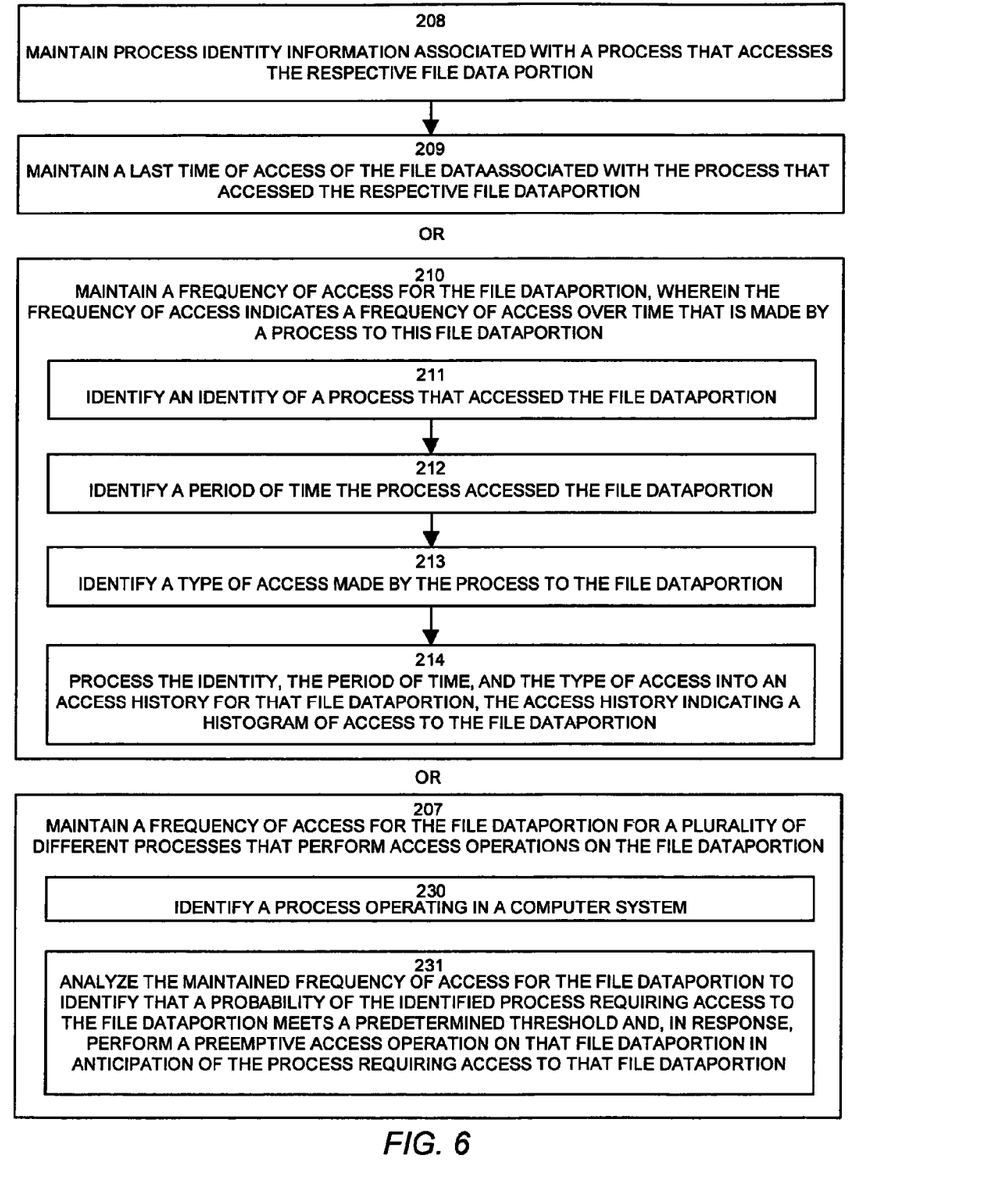
FIG. 6 is a flow chart of processing steps that shows details of processing operations to maintain access pattern information in accordance with one configuration of the fine grained file data storage system.

FIG. 6 is a flow chart of processing steps the access manager 150 performs to indicate access pattern information 163 associated with a file data portion 165, whereby the access pattern information 163 indicates a pattern of access of the respective file data portion in accordance with one example embodiment.

In step 208, the access manager 150 maintains process identity information associated with a process that accesses the respective file data portion 165. Processes may include, but are not limited to, computer users, applications, execution threads, and the like. In sample configurations the process identity information may include an execution thread number and/or name, a user number and/or name, an application number and/or name, or any unique identifier that distinguishes such processes from one another. In a sample embodiment, the access manager 150 maintains process identity information associated with a first computer application (e.g., a backup application) and second computer application (e.g., a restore application) whereby both processes access the respective file data portion 165.

In step 209, the access manager 150 maintains a last time of access of the data associated with the process that accessed the respective file data portion 165. More specifically, the last time of access may indicate the last time a process modified the data, read the data, copied the data, and the like. In operation, the access manager 150 maintains a last time of access associated with a process in addition to the identity information associated with the process. As shown in a sample configuration, the access manager 150 maintains process identity and last time of access information for the data associated with a first process and second process that access the respective file data portion. As will be discussed further, a caching process may use the access pattern information as described herein for the purpose of memory management.

In step 210, the access manager 150 maintains a frequency of access for the file data portion representing the access over a time that is made by a process to this file data portion 165. Similar to the last time of access as described in step 209, the frequency of access may indicate the frequency at which a process modifies the data, reads the data, copies the data, and the like. For example, in one embodiment the access manager 150 may maintain a frequency of access for a backup process 180 that indicates the number of times the process has backed up data from the respective file data portion 165 over a time period (e.g., a week). Moreover, the access manager 150 may maintain multiple frequencies of access for respective multiple processes that access the file data portion. In this sense, as discussed more fully herein, a caching process may use these frequencies of access for the purpose of memory management.

In step 211, in maintaining a frequency of access for the file data portion 165, the access manager 150 identifies an identity of a process that accessed the file data portion. Similar to step 208, the identity of a process may include a process number and/or name, a user number and/or name, or any unique identifier that distinguishes processes from one another.

In step 212, in maintaining a frequency of access for the file data portion 165, the access manager 150 identifies a period of time the process accessed the file data portion 165. In one embodiment, the period of time the process accessed the file data portion is a predetermined fixed duration. For example, the access manager 150 may maintain a frequency of access for a data portion 165 of a database file 140 whereby the period of time is a predetermined interval of one month as defined by a database administrator. Moreover, in another embodiment the period of time is measured as the time interval between the occurrences of two events, typically data access events. For example, the access manager 150 may maintain a frequency of access for a file data portion 165 whereby the period of time is the time interval between the first access of the file data portion 165 by a process and the most recent access of the file data portion 165 by the process.

In step 213, in maintaining a frequency of access for the file data portion 165, the access manager 150 identifies a type of access made by the process to the file data portion 165. In general, the access manager 150 maintains a type of data associated with the user of the respective file data portion 165 whereby the type of access indicates at least one, i) read access was made to the file data portion, ii) write access was made to the file data portion, iii) read-write access was made to the file data portion, and iv) any access was made to the file data portion. For example, assume that a process has recorded only a read type of access to a file data portion 165, whereby this type of access is typically attributable to the back up of data. In such a case, a backup process 180 may use this "read only" access information to facilitate the efficient backup of database files by performing pre-caching and/or buffering.

Alternatively, in another embodiment the access manager 150 provides a type of data access associated with the user of the respective file data portion 165 whereby the type of access indicates at least one of a sequential pattern of access and a random pattern of access. As an example, a caching, or buffering, process 190 may use a type of access that indicates a sequential pattern of access to efficiently stream the file data portions 165 of a media file.

In step 214, in maintaining a frequency of access for the file data portion 165, the access manager 150 processes the identity, the period of time, and the type of access into an access history for that file data portion 165, whereby the access history indicates a histogram of access to the file data portion 165. In turn, the processes that are identified in the histogram associated with a particular file data portion 165 may use the information in the histogram (e.g., period of time, type of access, etc.) for processing that particular file data portion 165. Thus, various processes (e.g., backup, caching, etc.) may use the information contained in the file data portion histograms to facilitate efficient processing of the respective file data portion 165.

In step 230, the access manager 150 identifies a process in a computer system. For example, the process may be identified by a process number and/or process name.

In step 231, the access manager 150 analyzes the maintained frequency of access for the file data portion 165 to identify that a probability of the identified process requiring access to the file data portion 165 meets a predetermined threshold. In response, the access manager 150 performs a preemptive access operation on that file data portion 165 in anticipation of the process requiring access to that file data portion 165. For example, suppose that a predetermined threshold value regarding the frequency of access for a particular data portion 165 of a database file 140 is three accesses per week. Further assume that a user of the database has accessed the particular data portion 165 of the database file 140 five times in the course of one week. For the purpose of this example, the access manager 150 would recognize that this user has exceeded the access threshold for a maintained frequency of access of the particular file data portion 165. Thus, the access manager would perform a preemptive operation on the file data portion 165 (e.g., caching the file data portion in more accessible memory) since the user/process has exceeded the access threshold.

Figure 7:
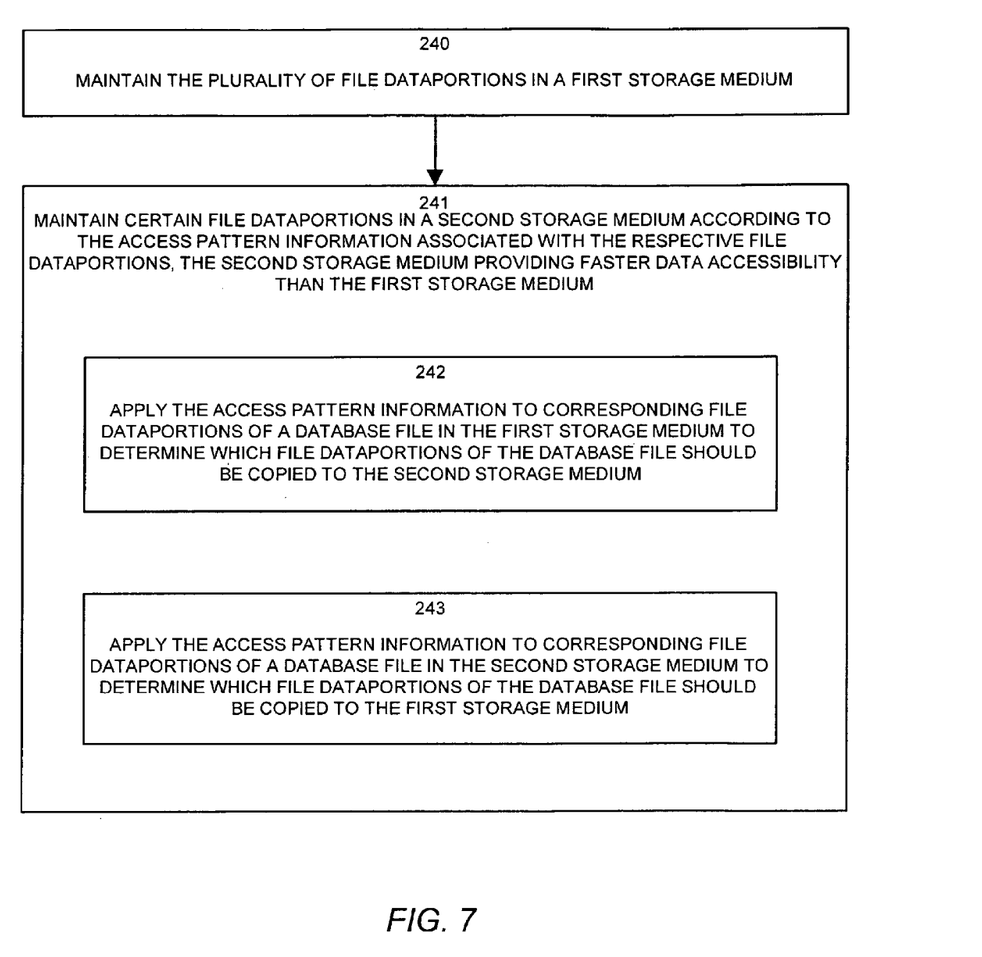
FIG. 7 is a flow chart of processing steps that shows details of processing operations to perform processing on file data portions having respective access pattern information in accordance with one configuration of the fine grained file data storage system.

FIG. 7 is a flow chart of processing steps the caching process 190 performs to use the access pattern information for memory management in accordance with one example embodiment.

In step 240, the caching process 190 maintains the plurality of file data portions 165 in a first storage medium 125. Typically, the first storage medium 125 may be any one of a tape drive, disk drive, RAID, and the like, or any combination thereof.

In step 241, the caching process 190 maintains certain file data portions 165 in a second storage medium 195 according to the access pattern information 163 associated with the respective file data portions 165 whereby the second storage medium 195 provides faster accessibility than the first storage medium 125. Typically, the second storage medium 195 is a cache memory device (e.g., L1 or L2 on-board cache) that maintains certain file data portions 165 from the first storage device such that a process and/or user may have faster access to those file data portions. Thus, in one configuration the caching process 190 maintains file data portions 165 in a cache memory device 195 according to the access pattern information 163 associated with the respective file data portions.

Alternatively, an example embodiment comprises a hierarchical storage management (HSM) system whereby the lower order of storage devices includes the slower, less expensive devices. Conversely, the higher order of storage devices includes the faster, more expensive devices. In such a system, the first storage medium 125 resides in the lower order of devices while the second storage medium 195 resides in the higher order of devices. In this manner, the caching process 190 maintains file data portions 165 in a higher order second storage medium 195 (e.g., a local disk drive), vis-à-vis a lower order first storage medium 125 (e.g., remote tape drive), according to the access pattern information 163 associated with the respective file data portions. For purposes of these examples, the access pattern information may include any of the abovementioned examples including, but not limited to, a frequency of access, a read type of access, a read-write type of access, a sequential type of access, a random type of access, and the like.

In step 242, the caching process 190 applies the access pattern information 163 to corresponding data portions 165 of a database file 140 in the first storage medium 125 to determine which data portions 165 of the database file 140 should be copied to the second storage medium 195. In other words, the caching process 190 may create a set of rules (e.g., replacement policy) such that certain database file data portions 165 should be written to the second storage medium 195 (e.g., cache memory) according to the access pattern information 163. For example, the caching process may write certain database file data portions 165 to cache memory if the access pattern information (e.g., frequency of access) exceeds a threshold limitation.

In step 243, the caching process 190 applies the access pattern information 163 to corresponding data portions 165 of a database file 140 in the second storage medium 195 to determine which data portions 165 of the database file 140 should be copied to the first storage medium 125. In this manner, the caching process 190 may create a set of rules (e.g., write-through policy) such that certain file data portions 165 should be written to the first storage medium 125 (e.g., local disk drive) according to the access pattern information 163. As an example, the caching process 190 may write certain database file data portions 165 that have remained in cache memory 195 back to the local disk drive 125 if the access pattern information falls below a predetermined threshold limitation (e.g. the file data portion is stale).

It is noted that example configurations disclosed herein include the access manager application 150-1 itself (e.g., in the form of unexecuted or non-performing logic instructions and/or data). The access manager application 150-1 may be stored (e.g. as code or other data) or encoded on a computer readable medium (such as a floppy disk), hard disk, electronic, magnetic, optical or other computer readable medium. The access manager application 150-1 may also be stored in memory system 112 such as firmware, read only memory (ROM), or, as in this example, as executable code in, for example, random access memory (RAM). In addition to these embodiments, it should also be noted that other embodiments herein include the execution of the access manager application 150-1 in the processor 113 as the access manager process 150-2. Those skilled in the art will understand that the computer system 110 may include other processes and/or software and hardware components, such as an operating system not shown in this example.

While configurations of the system and method have been particularly shown and described with references to configurations thereof, it will be understood by those skilled in the art that various changes in form and details may be made therein without departing from the scope of the invention. Accordingly, the present invention is not intended to be limited by the example configurations provided above.

What is claimed is:

1. A computer-implemented method in which a computer system initiates execution of software instructions stored in memory for processing data, the computer-implemented method comprising:

Identifying, by at least a processor in the computer system, a document file to be stored within a storage medium of the computer;

dividing, by at least a processor in the computer system, the document file into a plurality of document portions;

storing the plurality of document portions within the storage medium where each of the document portions is separately accessible;

maintaining respective access information associated with each document portion stored within the storage medium, the respective access information for each document portion being stored with the document portion as part of a file system structure of the storage medium and indicating:

i) modification information that indicates if each of the plurality of document portions have been modified;

ii) access pattern information associated with each of the plurality of document portions, the access pattern information indicating a pattern of access specific to each document portion, wherein the access pattern information includes process identity information associated with a process that accesses each document portion, a frequency of access for each document portion indicating a frequency of access within a time period by the process to each document portion, and a type of access made by the process to each document portion;

iii) a number of times a data replication process accesses the document portion of a database file within a specific time frame; and iv) maintaining multiple frequencies of access for multiple processes that access the document portion;

wherein operating the data replication process for each document portion comprises:
 identifying a first time that indicates a most recent application of the data replication process to the document portion;
 identifying a second time that indicates a most recent modification of the document portion; and
 replicating the document portion from the first medium to the second medium if the second time is more recent than the first time, wherein replicating the document portion from the first medium to the second medium comprises:
  applying a backup algorithm to store the document portion from the first medium to a backup storage device, application of the backup algorithm comprising:
   copying document portions associated with a database file from the first medium to a second file in the backup storage device if document portions associated with the database file have been modified since the most recent application of the backup algorithm to the database file, the document portions associated with the database file are stored in a noncontiguous configuration in the first medium; and
  maintaining modification information in the form of a backup record for each document portion that is copied from the database file to the second file in the backup storage device, the backup record indicates when the document portion is copied from the database file to the second file in the backup device and when the document portion of the database file was last modified in the first medium; and
 preloading a document portion from the plurality of document portions by performing a preemptive memory access operation on the document portion in anticipation of a process requesting access to the document portion based, at least in part, on the access pattern information, wherein the preloading loads the document portion from the storage medium to the memory of the computer.

2. The computer-implemented method of claim 1 wherein maintaining the access information comprises:
 providing a timestamp that indicates when the document portion was modified; and
 operating a data replication process to use the access information associated with each document portion to replicate a document portion from the storage medium to a second storage medium if the document portion has been modified since a former replication of the document portion without replicating unmodified document portions, the second storage medium being a backup storage device that is separate from the first storage medium.

3. The computer-implemented method of claim 1 wherein the document file is a data file maintained by a file system, and wherein storing the plurality of document portions within the storage medium includes
 backing up the file system by operating a backup process to back up only data portions of the document file that have changed since a former backup of data portions for the document file wherein the data portions amount to less than a total number of document portions that make up an entirety of the document file.

4. The computer-implemented method of claim 1 wherein maintaining access pattern information associated with the document portion comprises:
 maintaining process identity information associated with a process that accesses the document portion; and
 maintaining a last time of access of the document portion associated with the process.

5. The computer-implemented method of claim 1 wherein indicating access pattern information associated with the document portion comprises:
 maintaining a frequency of access for the document portion, the frequency of access indicating a frequency of access, within a time period, that is made by a process to the document portion.

6. The computer-implemented method of claim 1, wherein maintaining access pattern information includes maintaining a frequency of access for a document portion and comprises:
 identifying an identity of a process that accessed the document portion;
 identifying a period of time the process accessed the document portion;
 identifying a type of access made by the process to the document portion;
 processing the identity, the period of time, and the type of access into an access history for the document portion, the access history being a histogram of access to the document portion.

7. The computer-implemented method of claim 1 wherein indicating access pattern information associated with the document portion comprises:
 maintaining a type of document file access associated with a user of the document portion, the type of file data access indicating at least one:
  i) read access was made to the document portion;
  ii) write access was made to the document portion;
  iii) read-write access was made to the document portion; and
  iv) any access was made to the document portion.

8. The computer-implemented method of claim 1 wherein maintaining access pattern information associated with the document portion comprises:
 providing a type of access associated with a user of the document portion, the type of access indicating whether the access is a sequential pattern of access or a random pattern of access.

9. The computer-implemented method of claim 1 wherein indicating access pattern information associated the document portion comprises:
 maintaining a frequency of access for the document portion for a plurality of different processes that perform access operations on the document portion; and
 wherein the computer-implemented method further comprises:
  identifying a process operating in a computer system; and
  analyzing the maintained frequency of access for the document portion to identify that a probability of the identified process requiring access to the document portion meets a predetermined threshold, and in response, performing the preloading.

10. The computer-implemented method of claim 1 further comprising:
 storing one or more of the plurality of document portions in a second storage medium according to the access pattern information associated with each document portion, the second storage medium providing faster data accessibility times than the storage medium, wherein storing document portions in the second storage medium comprises:

determining whether the access pattern information corresponding to each document portion exceeds a frequency of access for storing a document portion in the second storage medium, wherein the second storage medium is separate from the memory and the storage medium.

11. The computer-implemented method of claim 1, further comprising:
executing a restore process that restores only the document portion of the file without restoring all document portions of the file.

12. The computer-implemented method of claim 9, further comprising:
identifying that the document portion is accessed regularly at specific time; and
based on the specific time identified, performing the preloading.

13. A non-transitory computer-readable medium storing computer executable instructions that when executed by a computer cause the computer to perform a method, the method comprising:
identifying a document file to be stored within a storage medium of the computer;
dividing the document file into a plurality of document portions;
storing the plurality of document portions within the storage medium where each of the document portions is separately accessible;
maintaining respective access information associated with each document portion stored within the storage medium, the respective access information for each document portion being stored with the document portion as part of a file system structure of the storage medium and indicating:
  i) modification information that indicates if each of the plurality of document portions have been modified;
  ii) access pattern information associated with each of the plurality of document portions, the access pattern information indicating a pattern of access specific to each document portion, wherein the access pattern information includes process identity information associated with a process that accesses each document portion, a frequency of access for each document portion indicating a frequency of access within a time period by the process to each document portion, and a type of access made by the process to each document portion;
  iii) a number of times a data replication process accesses the document portion of a database file within a specific time frame; and
  iv) maintaining multiple frequencies of access for multiple processes that access the document portion;
wherein operating the data replication process for each document portion comprises:
  identifying a first time that indicates a most recent application of the data replication process to the document portion;
  identifying a second time that indicates a most recent modification of the document portion; and
  replicating the document portion from the first medium to the second medium if the second time is more recent than the first time, wherein replicating the document portion from the first medium to the second medium comprises:
    applying a backup algorithm to store the document portion from the first medium to a backup storage device, application of the backup algorithm comprising:
      copying document portions associated with a database file from the first medium to a second file in the backup storage device if document portions associated with the database file have been modified since the most recent application of the backup algorithm to the database file, the document portions associated with the database file are stored in a noncontiguous configuration in the first medium; and
      maintaining modification information in the form of a backup record for each document portion that is copied from the database file to the second file in the backup storage device, the backup record indicates when the document portion is copied from the database file to the second file in the backup device and when the document portion of the database file was last modified in the first medium; and
preloading a document portion from the plurality of document portions by performing a preemptive memory access operation on the document portion in anticipation of a process requesting access to the document portion based, at least in part, on the access pattern information, wherein the preloading loads the document portion from the storage medium to the memory of the computer.

14. The non-transitory computer-readable medium of claim 13, further comprising:
executing a restore process that restores only the document portion of the file without restoring all document portions of the file.

* * * * *

UNITED STATES PATENT AND TRADEMARK OFFICE
CERTIFICATE OF CORRECTION

| | | |
|---|---|---|
| PATENT NO. | : 8,548,948 B2 | Page 1 of 2 |
| APPLICATION NO. | : 11/401697 | |
| DATED | : October 1, 2013 | |
| INVENTOR(S) | : Glover | |

It is certified that error appears in the above-identified patent and that said Letters Patent is hereby corrected as shown below:

On the title page, References Cited, column 2, under Other Publications, line 2, delete "Failuer;" and insert -- Failure; --, therefor.

In the Drawings:
On sheet 4 of 7, in figure 4, in box No. 206, line 1, delete "INDICATDES" and insert -- INDICATES --, therefor.

On sheet 6 of 7, in figure 6, in box No. 209, line 1, delete "DATAASSOCIATED" and insert -- DATA ASSOCIATED --, therefor.

On sheet 6 of 7, in figure 6, in box No. 209, line 2, delete "DATAPORTION" and insert -- DATA PORTION --, therefor.

On sheet 6 of 7, in figure 6, in box No. 210, line 1, delete "DATAPORTION," and insert -- DATA PORTION, --, therefor.

On sheet 6 of 7, in figure 6, in box No. 210, line 3, delete "DATAPORTION" and insert -- DATA PORTION --, therefor.

On sheet 6 of 7, in figure 6, in box No. 211, line 1, delete "DATAPORTION" and insert -- DATA PORTION --, therefor.

On sheet 6 of 7, in figure 6, in box No. 212, line 1, delete "DATAPORTION" and insert -- DATA PORTION --, therefor.

On sheet 6 of 7, in figure 6, in box No. 213, line 1, delete "DATAPORTION" and insert -- DATA PORTION --, therefor.

Signed and Sealed this
Twenty-fifth Day of February, 2014

Michelle K. Lee
*Deputy Director of the United States Patent and Trademark Office*

CERTIFICATE OF CORRECTION (continued)
U.S. Pat. No. 8,548,948 B2

On sheet 6 of 7, in figure 6, in box No. 214, line 2, delete "DATAPORTION," and insert -- DATA PORTION, --, therefor.

On sheet 6 of 7, in figure 6, in box No. 214, line 3, delete "DATAPORTION" and insert -- DATA PORTION --, therefor.

On sheet 6 of 7, in figure 6, in box No. 207, line 1, delete "DATAPORTION" and insert -- DATA PORTION --, therefor.

On sheet 6 of 7, in figure 6, in box No. 207, line 2, delete "DATAPORTION" and insert -- DATA PORTION --, therefor.

On sheet 6 of 7, in figure 6, in box No. 231, line 1, delete "DATAPORTION" and insert -- DATA PORTION --, therefor.

On sheet 6 of 7, in figure 6, in box No. 231, line 3, delete "DATAPORTION" and insert -- DATA PORTION --, therefor.

On sheet 6 of 7, in figure 6, in box No. 231, line 4, delete "DATAPORTION" and insert -- DATA PORTION --, therefor.

On sheet 6 of 7, in figure 6, in box No. 231, line 5, delete "DATAPORTION" and insert -- DATA PORTION --, therefor.

On sheet 7 of 7, in figure 6, in box No. 240, line 1, delete "DATAPORTIONS" and insert -- DATA PORTIONS --, therefor.

On sheet 7 of 7, in figure 6, in box No. 241, line 1, delete "DATAPORTIONS" and insert -- DATA PORTIONS --, therefor.

On sheet 7 of 7, in figure 6, in box No. 241, line 3, delete "DATAPORTIONS," and insert -- DATA PORTIONS, --, therefor.

On sheet 7 of 7, in figure 6, in box No. 242, line 2, delete "DATAPORTIONS" and insert -- DATA PORTIONS --, therefor.

On sheet 7 of 7, in figure 6, in box No. 243, line 2, delete "DATAPORTIONS" and insert -- DATA PORTIONS --, therefor.

On sheet 7 of 7, in figure 6, in box No. 243, line 3, delete "DATAPORTIONS" and insert -- DATA PORTIONS --, therefor.

In the Claims
In column 12, line 36, in Claim 1, delete "Identifying," and insert -- identifying, --, therefor.